G. C. RAHN.
BEEHIVE.
APPLICATION FILED JULY 21, 1913.
1,116,923.
Patented Nov. 10, 1914.
3 SHEETS—SHEET 1.
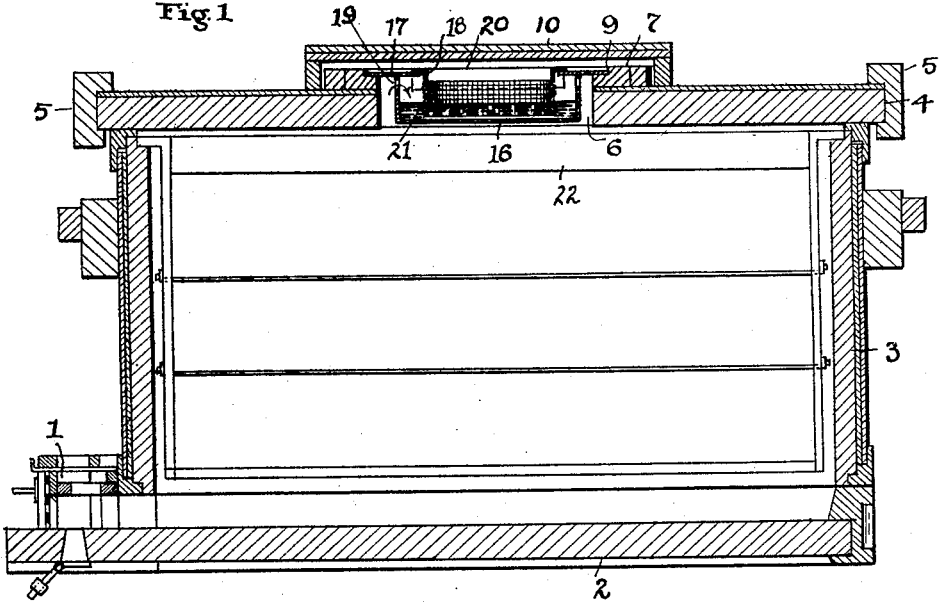
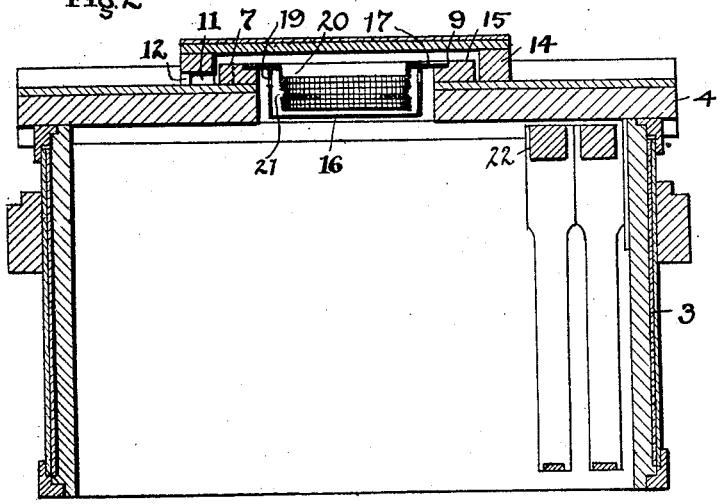
ATTEST
E. M. Fisher
INVENTOR
George C. Rahn
By Fisher & Moser, ATTYS.

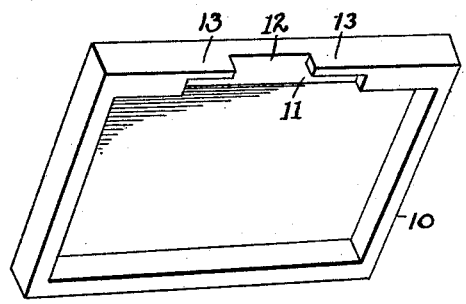
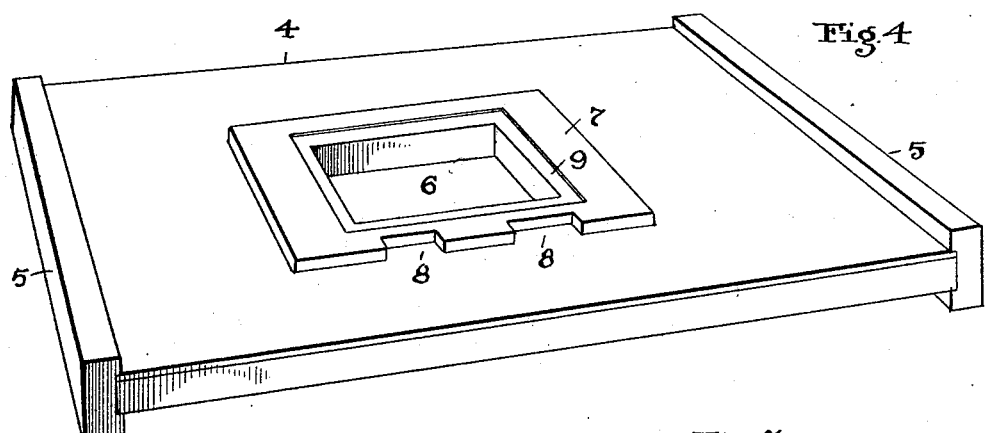
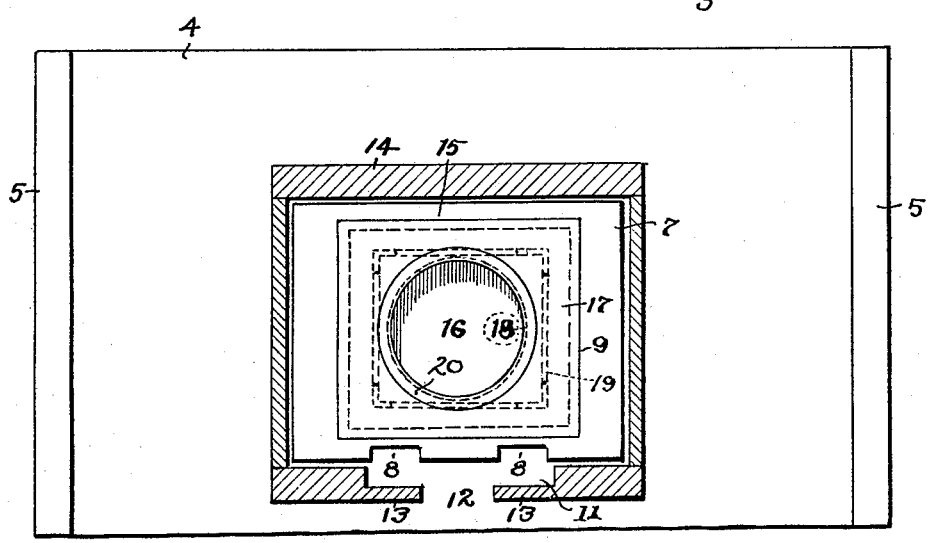

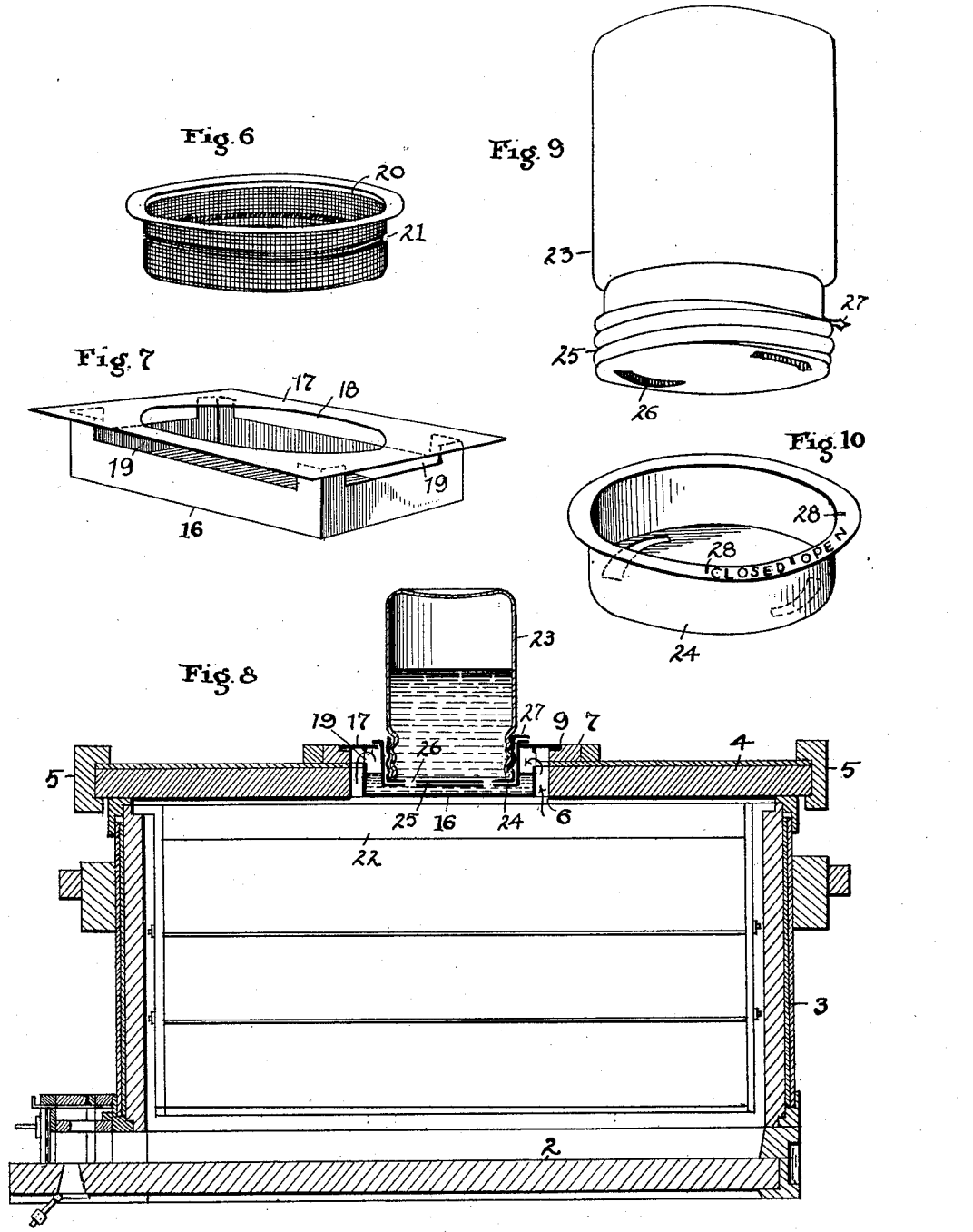

UNITED STATES PATENT OFFICE.

GEORGE C. RAHN, OF HAILEYBURY, ONTARIO, CANADA, ASSIGNOR OF ONE-HALF TO MARTIN J. O'DONNELL, OF CLEVELAND, OHIO.

BEEHIVE.

1,116,923. Specification of Letters Patent. Patented Nov. 10, 1914.

Original application filed January 23, 1913. Serial No. 743,733. Divided and this application filed July 21, 1913. Serial No. 780,381.

*To all whom it may concern:*

Be it known that I, GEORGE C. RAHN, a citizen of the United States, residing at Haileybury, in the district of Nipissing, Ontario, Canada, have invented certain new and useful Improvements in Beehives, of which the following is a specification.

This invention comprises a combined ventilating cover and feeding device for beehives, substantially as herein shown and described and more particularly pointed out in the claims.

Reference is also directed to my application for improvements in bee-hives filed January 23, 1913, Ser. No. 743,733, of which this application is a division.

The present invention is designed to provide a cover and feeding device adapted to fit and be used with any bee-hive of standard construction, and the parts thereof are particularly constructed to ventilate the hive, to hold food and drink in an accessible place within the top of the hive, to protect the bees and honey within the hive and to generally promote the development and health of the bees and the storing of honey.

In the accompanying drawings, Figure 1 is a sectional view vertically through a beehive embodying my invention, and Fig. 2 is a sectional view at right angles to Fig. 1. Figs. 3 and 4 are perspective views of the cap and cover respectively, and Fig. 5 is a plan view of the cover and the feed cup and showing the rim of the cup in section. Figs. 6 and 7 are perspective views of the gage ring and feed cup respectively. Fig. 8 is a sectional view of a bee-hive without the cap and showing a bottle sealed within the feed cup. Figs. 9 and 10 are perspective views of the bottle and valve-seat respectively.

The bee-hive shown comprises the separate bottom board 2, brood box 3, and cover 4, all of which are of standard size and separably related.

Box 3 has the usual opening for the bees at its bottom and front, but as shown this opening is guarded by an entrance box 1 which is more fully described in the application above referred to.

Cover 4 resembles the ordinary cover in shape and size and in that it is provided with two side cleats 5 and is adapted to rest in slidable position on any one of the box sections of a bee-hive. However, this cover differs from the ordinary cover in that it is provided with a central opening 6 bordered by a raised molding 7 having two notches 8 in one outer side-edge and a recessed seat 9 at its inner edges. A cap 10 fits loosely but closely about molding 7 and rests upon the top of the cover in spaced relation with the top of the molding so that the bees have an entrance and exit by way of the notches 8, but only when the cap 10 is set as shown in Fig. 5 with the notches 8 opposite a channel 11 and a central door 12 in the bottom edge of the cap. The roof of the channel is below the top surface of the molding 7, see Fig. 2, which relation of parts with the projecting lips 13 on the cap at either side of the door, protect the interior from the direct rays of light and weather. The indirect passage thus provided also serves for ventilation as well as an entrance and exit for the bees. But if the bees are to be shut in at the top of the hive and the cap merely used for ventilation, the cap is reversely placed over opening 6 which brings the solid side 14 of the cap opposite notches 8 and places door 12 opposite the unnotched side 15 of molding 7. The slight space between the molding and the cap edge affords ventilation but not enough room for the bees to pass, especially as the roof of the door is below the top surface of the molding. This manner of placing the cap upon the cover prevents bees from other colonies from entering the bee-hive and robbing this particular colony of their artificial food when placed in pan 16 which occupies opening 6.

The function of the edge recess 9 in the molding 7 is to seat and center the rectangular pan 16 which has a top 17 with a round opening 18 therein. The pan is much smaller than the top so that the side walls of the cup are spaced apart from the sides of opening 6, and slots 19 in the side walls of the pan permit the bees to pass from the hive to the pan to feed on any liquid or solid foods placed therein.

It is often desirable to remove the cap, and the bees within the hive are prevented from escaping at this time by a ring 20 of wire cloth or perforated material which is seated in the round opening 18 centrally in the top of the pan. The overlapping top and the retired walls of the pan also cut off the light to the interior of the hive to a certain extent when the cap is removed in supplying the food or in observing the bees. If the cap is left off for any length of time a wire cloth may be laid over the open ring 20. In this way ample ventilation may be obtained at any time and climatic changes are easily guarded against. Ring 20 has an annular bead 21 about the same whereby the depth of the liquid food placed in the pan may be gaged so it will not overflow through the slots 19 into the hive. The bottom of the pan is flush with or slightly raised above the bottom of the cover so that the pan will not engage or strike the top edges of the box 3 in sliding movements of the cover.

By locating the feeding and ventilating device at the highest point of the hive and within the hive, the bees can be fed in cold weather or at night. To illustrate, as the heat of the colony rises the bees cluster around the feed-pan and carry the food to the combs below. Thus feeding can be done at any time without disturbing the bees or exposing them to the weather and also without attracting other colonies to rob them. Weak colonies are also built up to strong and healthy colonies by feeding the bees at times of the year when there are no natural honey sources. Also a small amount of food may be furnished daily in the spring of the year before there are any natural honey sources and the queen bee will start to fill the combs with brood and a large early swarm will be the result. This is of advantage, as swarms coming early in the season are usually the best honey producers. The central opening in the cover will also carry off all moisture arising from the colony and the hive and the combs will be kept dry. A cover having a relatively small opening is also of advantage in that a new queen can be introduced to a colony without removing the cover and breaking the sealed joints. This step may be taken by removing cap 10 and the pan and seating a queen cage upon the top bars of the frames 22 within box 3. When there is doubt as to whether the colony is queenless and it is undesirable to remove the frames to search for the queen, all that is necessary is to place the queen cage within the cover and the action of the bees will indicate whether the new queen is acceptable to the colony. The cover as thus constructed with a central bordered opening 6 is also of utility in that a queen-mating box can be placed thereon in lieu of the cap 10. The object here is to unite the small colonies which occupy the queen-mating box with the larger colony in box 3 after the queen-breeding season has passed. The feed pan 16 is also of utility in raising young bees, as the colony can be fed with a bottle 23 when upheld in inverted position within a valve-seat 24 which is adapted to rest within opening 18 of the pan. The screw-cover 25 of the bottle has segmental openings 26 arranged to co-act with like openings in the valve-seat 24 and the flow of the liquid may be partly or entirely shut off by rotating the bottle, a proceeding greatly facilitated by the indicating finger 27 on the screw-cover and the markings 28 on the flange of the valve-seat 24. The level of the liquid in the pan 16 may be thereby constantly maintained, as it will be noted that the slots 19 in the side wall of the feed-cup are at a much higher elevation than the bottom of the valve-seat. If the bees are fed fast they do not raise as much brood as when fed slow and regular. But it often happens that late in the season the beekeeper finds the hive short of stores and he wants to feed them fast and he can do so with the bottle and pan as shown in Fig. 8.

What I claim is:

1. In a bee-hive, a hive cover having a central opening with a raised molding about the same, a pan seated within said opening, and a removable cap seated in sleeved relation with said molding.

2. In a bee-hive, a hive cover and a removable cap therefor having an opening in its side, said cover having an opening and a notched molding about the same adapted to be inclosed by said cap, and a pan removably seated within said opening with its bottom substantially flush with the bottom of said cover.

3. In a bee-hive, a box section and a removable cover therefor having an opening therein bordered by a raised molding having a notched passage for the bees and a removable cap to seat over said opening having a border with a passage-way to coincide with said notched passage when the parts are assembled in one position of rest.

4. In a bee-hive, a box section and a cover therefor having a central opening bordered by a notched molding and a cap for said opening having a projecting border provided with a side passage of less height than said molding.

5. In a bee-hive, a box section and a removable cover therefor provided with a central opening having a raised border with a vertical passage for the bees, and a cap for said cover having a lateral opening in its edge adapted to register with said passage when the cap is in one position and to be closed if the cap is seated otherwise.

6. In a bee-hive, a box section and a removable cover provided with a central opening, and a bee-escape guard for said opening, comprising a pan and a screen ring suspended within said pan.

7. In a bee-hive, a box section and a removable cover provided with a rectangular opening centrally therein, a rectangular cap having a flanged border to cover said opening, a flanged pan removably suspended within said opening, and a screen guard for said pan.

8. In a bee-hive, a cover having side cleats and a central opening, a feed pan having a top flange to suspend said cover completely within said opening and provided with side openings to give the bees within the hive access to the pan, and a cap to cover said cover opening and the pan.

9. In a bee-hive, a cover having an opening with a notched molding about the same, a feed pan having an open top seated upon said molding, a screen ring seated within said pan, and a cap having a notched border to rest upon said cover about said molding.

10. In a bee-hive, a cover having a feed pan removably seated therein, a cap to cover said feed pan, and a screen ring for said pan having an annular bead about the same.

11. In a bee-hive, a cover having a central opening with a recessed edge, a pan having a projecting top seated within said recessed edge, a screen member depending from said top into said pan, and a removable cap to shield said screen member and pan.

12. In a bee-hive, a cover having a central opening, a flanged feed pan suspended withing said opening apart from the walls thereof, and having openings in its side for the passage of the bees, and a removable cap to seat upon said cover over said pan.

13. In a bee-hive, a cover having a removable feed pan suspended therein, said pan having bee-entrance openings in its sides and a circular opening in its top, in combination with a bottle having an outlet end adapted to fit said pan top opening and to extend below the level of said pan side openings.

In testimony whereof I affix my signature in presence of two witnesses.

GEORGE C. RAHN.

Witnesses:
  ALICE C. McQUARRIE,
  JAMES McQUARRIE.

---

Copies of this patent may be obtained for five cents each, by addressing the "Commissioner of Patents, Washington, D. C."